US008553669B2

(12) United States Patent
Finkelstein

(10) Patent No.: US 8,553,669 B2
(45) Date of Patent: Oct. 8, 2013

(54) SYSTEMS AND METHODS FOR ASSIGNING CUSTOMERS TO GROUPS FOR THE TRANSMISSION OF BROADBAND DATA SIGNALS

(75) Inventor: Jeffrey L. Finkelstein, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 228 days.

(21) Appl. No.: 13/103,311

(22) Filed: May 9, 2011

(65) Prior Publication Data

US 2012/0287796 A1    Nov. 15, 2012

(51) Int. Cl.
*H04J 1/00*    (2006.01)
(52) U.S. Cl.
USPC ............................ 370/343; 370/252; 455/450
(58) Field of Classification Search
USPC .......... 370/252, 329–338, 341–347; 455/450
See application file for complete search history.

(56) References Cited

U.S. PATENT DOCUMENTS

| 6,556,809 | B1 * | 4/2003 | Gross et al. ................... 455/12.1 |
| 7,801,079 | B2 * | 9/2010 | Saidi et al. ...................... 370/331 |
| 2005/0265468 | A1 * | 12/2005 | Fujii et al. ...................... 375/260 |
| 2007/0223423 | A1 * | 9/2007 | Kim et al. ....................... 370/334 |
| 2009/0180432 | A1 * | 7/2009 | Harada et al. .................. 370/329 |
| 2011/0019637 | A1 * | 1/2011 | Ojala et al. ..................... 370/329 |
| 2011/0069745 | A1 * | 3/2011 | Thompson et al. ........... 375/224 |
| 2012/0294179 | A1 |  11/2012 | Tafreshi |

* cited by examiner

*Primary Examiner* — Kan Yuen
(74) *Attorney, Agent, or Firm* — Sutherland Asbill & Brennan LLP

(57) ABSTRACT

Systems and methods are provided for assigning customers to groups for the transmission of broadband data signals. Respective linear impairment information for a plurality of customers of a service provider may be determined. Based at least in part upon an analysis of the determined linear impairment information, each of the plurality of customers may be assigned to one of a plurality of groups. The customers assigned to each of the plurality of groups are associated with similar linear impairments. Additionally, for each of the plurality of groups, one or more frequencies at which communications will be output by the service provider for receipt by the customers assigned to the respective group may be determined.

20 Claims, 4 Drawing Sheets

SYSTEMS AND METHODS FOR ASSIGNING CUSTOMERS TO GROUPS FOR THE TRANSMISSION OF BROADBAND DATA SIGNALS

CROSS-REFERENCE TO RELATED APPLICATION

This application is related to co-pending patent application Ser. No. 13/103,279, filed May 9, 2011, and entitled "Systems and Methods for Assigning a Customer Device to a Group of Customer Devices for the Transmission of Broadband Data Signals."

FIELD OF THE INVENTION

Aspects of the invention relate generally to the transmission of broadband data streams to recipients, and more particularly, to the assignment of recipients to groups for the transmission of broadband data streams.

BACKGROUND OF THE INVENTION

It is common for headend systems associated with service providers, such as a cable service provider system, to output broadband data signals for receipt by customer devices. Downstream data signals are typically output at one or more frequencies included in a downstream frequency band. For example, downstream data signals are commonly output within a frequency range of eighty-eight megahertz (88 MHz) to one gigahertz (1 GHz). Customer devices receive and process these data signals in order to provide various services, such as cable and telephone services, to users.

However, linear impairments and other distortions are typically introduced by a transmission network and associated with the data stream transmissions. Additionally, attenuation losses typically occur within the transmission network. These impairments and losses increase as the downstream transmission frequency increases. Additionally, as physical equipment, such as coaxial cable lines, degrades over time, the ability to transmit higher frequency signals to the customer devices is lost. Accordingly, improved systems and methods for determining frequencies at which broadband data streams are transmitted to customer devices are desirable. Additionally, improved systems and methods for assigning customers to groups for the transmission of broadband data streams are desirable.

BRIEF DESCRIPTION OF THE INVENTION

Some or all of the above needs and/or problems may be addressed by certain embodiments of the invention. Embodiments of the invention may include systems and methods for assigning customers to groups for the transmission of broadband data signals. In one embodiment, a method for assigning customers to groups may be provided. Respective linear impairment information for a plurality of customers of a service provider may be determined. Based at least in part upon an analysis of the determined linear impairment information, each of the plurality of customers may be assigned to one of a plurality of groups. The customers assigned to each of the plurality of groups are associated with similar linear impairments. Additionally, for each of the plurality of groups, one or more frequencies at which communications will be output by the service provider for receipt by the customers assigned to the respective group may be determined. In certain embodiments, the operations of the method may be performed by a service provider system associated with a service provider and comprising one or more computers.

In accordance with another embodiment of the invention, a system for assigning customers to groups for the transmission of broadband data signals may be provided. The system may include at least one communications interface and at least one processor. The at least one communications interface may be configured to receive, from a plurality of devices associated with customers of a service provider, respective equalization data for each of the plurality of devices. The at least one processor may be configured to (i) determine, based at least in part upon the equalization data, respective linear impairment information for each of the plurality of devices, (ii) assign, based at least in part upon an analysis of the determined linear impairment information, each of the plurality of devices to one of a plurality of groups, wherein the devices assigned to each of the plurality of groups are associated with similar linear impairments, and (iii) determine, for each of the plurality of groups, one or more frequencies at which communications will be output by the service provider for receipt by the devices assigned to the respective group.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
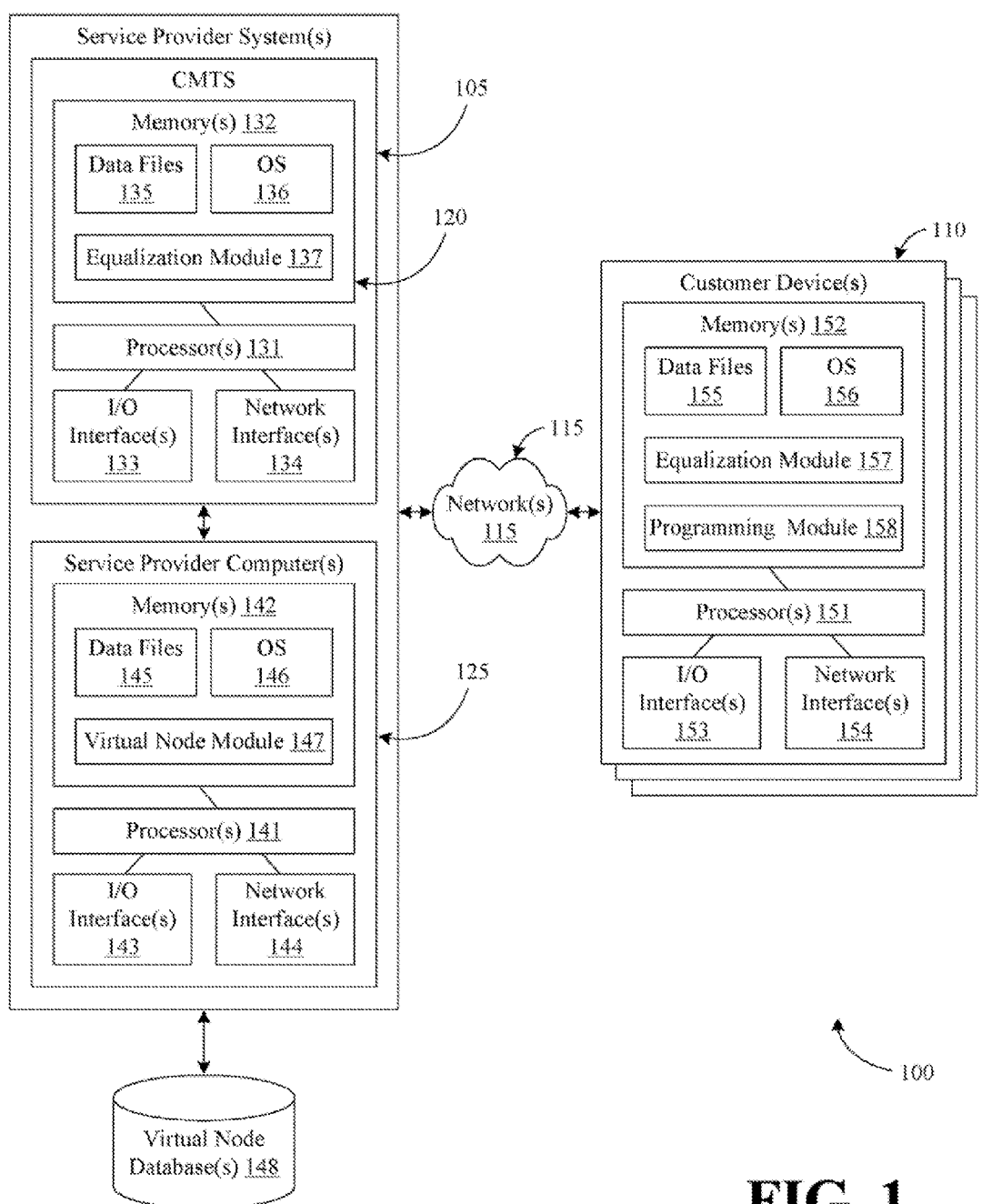
FIG. 1 illustrates a block diagram of an example system that may be utilized to assign customers to groups for the transmission of broadband data signals, according to an illustrative embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems and methods for assigning customers and/or customer devices to groups for purposes of communicating or transmitting broadband data signals. In one example embodiment, respective linear impairment information may be determined for a plurality of customers or customer devices. For example, impairment coefficient data may be determined for a customer, and an equalization coefficient may be calculated for the customer based at least in part on performing a Fourier transform on the impairment coefficient data. As desired, a wide variety of impairment coefficient data may be determined for the customer, such as a frequency response, a phase, and/or a group delay.

Once linear impairment information has been determined for the plurality of customers, each of the plurality of customers may be assigned to one of a plurality of groups based in part upon an analysis of the linear impairment information. The customers assigned to each of the plurality of groups may be associated with similar linear impairments. In certain embodiments, customers having similar linear impairments may be identified based at least in part on performing an inverse Fourier transform on at least a portion of the determined linear impairment.

One or more frequencies for outputting or transmitting communications to each of the plurality of groups may also be determined. For example, a frequency range for outputting communications for receipt by customers included in each group may be determined. In certain embodiments, the frequency range determined for each group may be based at least in part upon the linear impairments or approximate linear impairments associated with the groups. For example, a first group having a relatively higher amount of linear impairment than a second group may be assigned a first frequency range that is lower than a second frequency range assigned to the second group. In this regard, lower frequency ranges may be assigned to groups having higher linear impairments. A wide variety of frequency ranges may be assigned to each of the groups. For example, in certain embodiments, a downstream frequency range may be divided into approximately two hundred megahertz (200 MHz) blocks, and each of the groups may be assigned one of the blocks.

In certain embodiments, linear impairment information may be periodically and/or continuously determined for the customers. In this regard, the customers may be dynamically assigned to groups. For example, second linear impairment information may be determined for a customer, and the customer may be reassigned to a different group based upon an identified change in the linear impairment information for the customer. As one example, a customer may be assigned to a group having a lower frequency range as the linear impairments associated with the customer increase. Additionally, as customers are reassigned to different groups, equipment maintenance may be directed or requested. For example, it may be determined that coaxial cable or other physical equipment utilized to communicate signals to a customer has been degraded to a sufficient degree to merit replacement.

System Overview

An example system 100 for assigning customers to groups for outputting or transmitting broadband signals will now be described illustratively with respect to FIG. 1. The system 100 may include, for example, one or more service provider systems 105 and/or any number of customer devices 110 or programming processing components. Any number of suitable service provider networks 115 (e.g., cable networks, etc.) may facilitate communications between the service provider systems 105 and the customer devices 110. In certain embodiments, the service provider system 105 may receive data and/or data streams from any number of content providers. The service provider system 105 may also generate various data and/or data streams. The service provider system 105 may process received and/or generated data, and output any number of broadband communications signals and/or data streams for receipt by the one or more customer devices 110.

In certain embodiments, the service provider system 105 may include any number of suitable components or subsystems, such as one or more cable modem termination systems ("CMTSs") 120, one or more service provider computers 125, and/or other service provider components. As desired, these various components may facilitate the identification of impairments associated with customer devices 110 and/or the assignment of the customer devices 110 to groups. For example, a CMTS 120 or other suitable headend controller may facilitate an adaptive equalization process to determine impairment data associated with the customer devices 110. The service provider computers 125 may process the impairment data in order to group the customer devices 110 and/or determine one or more frequencies at which broadband signals will be output for communication to the customer devices 110. In certain embodiments, the service provider system 105 may include systems associated with a cable service provider or other service provider. Additionally, as desired, the service provider system 105 may include any number of other components, such as a conditional access system controller, any number of encryption devices, an electronic program guide data server, an on-demand server, a pay-per-view purchase server, a billing system, a profile server, etc.

As desired, one or more components of the system 100 may be processor-driven components or devices. In this regard, certain components of the system 100 may be configured for accessing and reading associated computer-readable media having stored thereon data and/or computer-executable instructions for implementing the various methods of the invention. Additionally, in certain embodiments, certain components of the system 100 may be optional and/or combined. For example, a CMTS 120 and service provider computer 125 may be implemented as a single component.

The CMTS 120 may be a suitable component or system configured to output and/or provide data services to customers of the service provider. For example, the CMTS 120 may be configured to output one or more broadband data signals for receipt by the customer devices 110. Additionally, the CMTS 120 may be configured to receive and process upstream signals that are output by the customer devices 110. In certain embodiments of the invention, the CMTS 120 may be configured to facilitate an adaptive equalization process for one or more of the customer devices 110. In this regard, the CMTS 120 may facilitate compensation for signal echoes and/or other impairments.

In certain embodiments, the CMTS 120 may include one or more processor-driven devices, such as a personal computer, a digital assistant, a personal digital assistant, a digital tablet, an Internet appliance, an application-specific circuit, a microcontroller, a minicomputer, or any other processor-based device. The execution of suitable computer-implemented instructions or computer-executable instructions by the CMTS 120 may form a special purpose computer or other particular machine that is operable to facilitate the adaptive equalization of the customer devices 110 and/or the determination of impairments associated with the customer devices 110.

The CMTS 120 may include one or more processors 131, one or more memory devices 132, one or more input/output ("I/O") interfaces 133, and/or one or more network interfaces 134. The processor(s) 131 may be configured to execute any number of software applications and/or computer-readable or computer-executable instructions. The memory devices 132 may include any number of suitable memory devices, such as caches, read-only memory devices, random access memory devices, magnetic storage devices, etc. The memory devices 132 may store data, executable instructions, and/or various program modules utilized by the processor(s) 131. Examples of data that may be stored by the memory devices 132 include data files 135 and/or any number of suitable program modules that may be executed by the processor(s) 131, such as an operating system ("OS") 136 and/or an equalization module 137 or equalization application.

The data files 135 may include any suitable data that facilitates the operation of the CMTS 120 and/or the management of one or more customer devices 110. For example, the data files 135 may include, but are not limited to, information associated with content output by the service provider, information associated with received upstream communication, information associated with the customer devices 110, distortion information, attenuation information, and/or equalization and/or error correction information. The OS 136 may be a suitable software module that controls the general operation of the CMTS 120. The OS 136 may also facilitate the execution of other software modules, for example, the equalization module 137.

The equalization module 137 may be a suitable software module or software application that is configured to identify impairments and/or distortions associated with the customer devices 110. Additionally, the equalization module 137 may be configured to facilitate adaptive equalization of the customer devices 110. In operation, a signal, such as a status symbol or other upstream signal, may be received from a customer device 110 and provided to the equalization module 137. The equalization module 137 may evaluate or analyze the signal and calculate an amount of distortion associated with the customer device 110. For example, one or more impairment coefficients for the customer device 110, such as a frequency response, a phase, and/or a group delay, may be determined.

Based upon the calculated distortion and/or impairment coefficients, the equalization module 137 may calculate an equalization coefficient for the customer device 110. In certain embodiments, the equalization coefficient may be determined based at least in part upon performing a Fourier transform on the impairment coefficients and/or distortion information. For example, impairment coefficient data combined with frequency and channel width may be processed by a Fourier transform to calculate an equalization coefficient. Once an equalization coefficient is calculated, the equalization coefficient may be communicated to the customer device 110. The customer device 110 may utilize the equalization coefficient to pre-distort received signals and compensate for distortions and/or impairments added to the signal. As desired, following the pre-distortion, the customer device 110 may communicate another signal to the CMTS 120 that may be processed to calculate a revised equalization coefficient that is output to the customer device 110. This process may be repeated in an adaptive manner to correct or compensate for distortions and/or impairments.

In addition to calculating equalization coefficients for the customer devices 110, the CMTS 120 may identify, calculate, or determine impairment information for the customer devices 110. For example, the CMTS 120 may calculate or determine respective linear impairment information for the customer devices 110. Once calculated, the impairment information may be provided to the service provider computer 125 for further processing in order to assign customer devices to groups or virtual nodes. One example of the operations that may be performed by the equalization module 137 is described in greater detail below with reference to FIG. 2.

With continued reference to the CMTS 120, the one or more I/O interfaces 133 may facilitate communication between the CMTS 120 and one or more input/output devices, for example, one or more user interface devices, such as a display, keypad, mouse, pointing device, control panel, touch screen display, remote control, microphone, speaker, etc., that facilitate user interaction with the CMTS 120. In this regard, user commands (e.g., programming commands, etc.) may be received by the CMTS 120. The one or more network interfaces 134 may facilitate connection of the CMTS 120 to any number of suitable networks, for example, one or more local area networks that facilitate communication with other components of the service provider system 105 and/or one or more service provider networks 115 or broadband networks (e.g., a cable network, a hybrid fiber coaxial ("HFC") network, etc.) that facilitate communication with any number of customer devices 110. In this regard, the CMTS 120 may communicate with other components of the system 100.

With continued reference to FIG. 1, any number of service provider computers 125 may be associated with the service provider system 105. A service provider computer 125 may be a suitable processor-driven device configured to assign customer devices to groups for the output of downstream data signals. Examples of suitable processor-driven devices that may be utilized as a service provider computer 125 include, but are not limited to, a personal computer, a digital assistant, a personal digital assistant, a digital tablet, an Internet appliance, an application-specific circuit, a microcontroller, a minicomputer, or any other processor-based device. The execution of suitable computer-implemented instructions or computer-executable instructions by the service provider computer 125 may form a special purpose computer or other particular machine that is operable to facilitate the identification of customer devices having similar impairments and/or the assignment of the customer devices 110 to groups.

The service provider computer 125 may include one or more processors 141, one or more memory devices 142, one or more input/output ("I/O") interfaces 143, and/or one or more network interfaces 144. The processor(s) 141 may be configured to execute any number of software applications and/or computer-readable or computer-executable instructions. The memory devices 142 may include any number of suitable memory devices, such as caches, read-only memory devices, random access memory devices, magnetic storage devices, etc. The memory devices 142 may store data, executable instructions, and/or various program modules utilized by the processor(s) 141. Examples of data that may be stored by the memory devices 142 include data files 145 and/or any number of suitable program modules that may be executed by the processor(s) 141, such as an operating system ("OS") 146 and/or a virtual node module 147 or virtual node application.

The data files 145 may include any suitable data that facilitates the operation of the service provider computer 125 and/or the assignment of customer devices 110 to groups. For example, the data files 145 may include, but are not limited to, information associated with one or more customer devices 110, impairment data associated with customer devices 110, information associated with available groups or available virtual nodes for assignment, and/or information associated with one or more frequencies for outputting signals for communication to the customer devices 110. The OS 146 may be a suitable software module that controls the general operation of the service provider computer 125. The OS 146 may also facilitate the execution of other software modules, for example, the virtual node module 147.

The virtual node module 147 may be a suitable software module or software application that is configured to assign customer devices 110 and/or customers to groups for the communication or transmission of broadband data signals. In operation, the virtual node module 147 may receive and/or identify information associated with impairments for one or more customer devices 110. For example, the virtual node module 147 may receive linear impairment information from the equalization module 137 of the CMTS 120. The virtual node module 147 may process the impairment information in order to identify customer devices 110 having similar impairments. In certain embodiments, the virtual node module 147 may perform an inverse Fourier transform on the linear impairments information. For example, an inverse Fourier transform may be performed to generate a distribution of customer devices 110. The virtual node module 147 may sort the customer devices 110 into groups, and each customer device 110 assigned to a particular group may have similar linear impairments. In certain embodiments, a different frequency and/or different range of frequencies may be utilized for each of the respective groups to communicate broadband signals to the customer devices 110 assigned to the respective groups.

Any number of groups may be utilized as desired in various embodiments of the invention. In certain embodiments, one or more downstream frequency bands or ranges may be divided into bands for each of the groups. For example, a downstream frequency band spanning from approximately eighty-eight megahertz (88 MHz) to approximately one gigahertz (1 GHz) may be subdivided, and each subdivision may be associated with a respective group of customer devices 110. In certain embodiments, approximately equal subdivisions may be formed for assignment to the groups. For example, the frequency band may be subdivided into components having bandwidths of approximately two hundred megahertz (200 MHz) (or some other value), and each group may be associated with a respective component. In other embodiments, one or more subdivisions of a downstream frequency band may have differing bandwidths. Indeed, a downstream frequency band may be subdivided in a wide variety of different ways.

According to an aspect of the invention, the linear impairments associated with the customer devices 110 may be taken into account during the assignment of the customer devices 110 to groups. Additionally, groups associated with relatively greater linear impairments may be associated with relatively lower frequency ranges. For example, customer devices 110 having relatively low impairments may be associated with a group having a relatively high frequency range, and customer devices 110 having relatively high impairments may be associated with a group having a relatively low frequency range. As a result, the downstream frequency band may be divided in order to maximize the capabilities of physical equipment (e.g., coaxial cables) and reduce maintenance requirements.

In certain embodiments, linear impairment information may be periodically and/or continuously determined for the customers. The virtual node module 147 may periodically and/or continuously evaluate the linear impairment information for the customer devices 110 and dynamically assign the customer devices 110 to groups. For example, second linear impairment information may be determined by the equalization module 137 for a customer device 110, and the virtual node module 147 may reassign the customer device 110 to a different group based upon an identified change in the linear impairment information for the customer. As one example, the customer device 110 may be reassigned from a first group to a second group having a lower frequency range as the linear impairments associated with the customer device 110 increase. Additionally, as customer devices 110 are reassigned to different groups, equipment maintenance may be directed or requested by the virtual node module 147. For example, it may be determined that coaxial cable or other physical equipment utilized to communicate signals to one or more customer devices 110 has been degraded to a sufficient degree to merit replacement.

The operations for the virtual node module 147 described above are provided by way of example only. A wide variety of other operations may be performed by the virtual node module 147 as desired in various embodiments of the invention. A few examples of the operations that may be performed by the virtual node module 147 are described in greater detail below with reference to FIGS. 3-4.

As desired, any number of virtual node databases 148 and/or other databases may be provided. The databases 148 may store a wide variety of information associated with the customer devices 110 and/or the groups to which the customer devices 110 are assigned. Examples of information that may be stored in the databases 148 include, but are not limited to, information associated with available groups, frequency ranges assigned to the groups, linear impairment information associated with the customer devices 110, information associated with the assignment of customer devices 110 to the groups, information associated with the reassignment of customer devices 110 to different groups, and/or information associated with directed maintenance and/or identified equipment failures. In certain embodiments, the databases 148 may be stored in the memory devices 142 associated with the service provider computers 125. In other embodiments, the databases 148 may be stored by one or more external devices and/or systems. Additionally, the databases 148 may be accessible by the virtual node module 147.

With continued reference to the service provider computer 125, the one or more I/0 interfaces 143 may facilitate communication between the service provider computer 125 and one or more input/output devices, for example, one or more user interface devices, such as a display, keypad, mouse, pointing device, control panel, touch screen display, remote control, microphone, speaker, etc., that facilitate user interaction with the service provider computer 125. In this regard, user commands (e.g., programming commands, etc.) may be received by the service provider computer 125. The one or more network interfaces 144 may facilitate connection of the service provider computer 125 to any number of suitable networks, for example, one or more local area networks that facilitate communication with other components of the service provider system 105. In this regard, the service provider computer 125 may communicate with the CMTS 120 and/or other components of the system 100.

With continued reference to FIG. 1, any number of customer devices 110 may be provided. Each customer device 110 may be a suitable device or component, such as a suitable processor-driven device, that facilitates the receipt and/or processing of broadband signals, such as a broadband cable signal. In certain embodiments, the customer device 110 may be a device or component that is situated within a customer's household or other structure associated with the customer. The customer device 110 may include suitable hardware and/or software components capable of receiving and processing a broadband signal (e.g., a cable signal, etc.) output by a service provider system 105. Examples of a suitable customer device 110 include, but are not limited to, a set-top box ("STB") (e.g., a cable STB, a digital satellite STB, an Internet Protocol Television STB, etc.), a virtual STB, an embedded STB, etc.

In certain embodiments, the customer devices 110 may be connected to one or more display devices, such as a television, associated with a customer. In other embodiments, the customer devices 110 may be embedded, incorporated into, and/ or executed on a display device. In operation, the customer devices 110 may receive at least a portion of a broadband data signal output by the service provider system 105, and the customer devices 110 may convert at least a portion of the received signal into content which is displayed or otherwise output by the display device. As desired, the customer devices 110 may receive a broadband data signal via any number of suitable service provider networks 115, such as a cable network that includes any number of optical fibers, coaxial cables, and/or cable drops. Additionally, any number of intermediary devices, such as broadband modems, routers, etc., may be situated between the service provider system 105 and the customer devices 110.

Each customer device 110 may be a suitable processor-driven device configured to receive broadband signals and provide broadband services to customers of the service provider. For example, each customer device 110 may include a digital assistant, a personal digital assistant, a digital tablet, an Internet appliance, an application-specific circuit, a microcontroller, a minicomputer, or any other processor-based device. The execution of suitable computer-implemented instructions or computer-executable instructions by the customer device 110 may form a special purpose computer or other particular machine operable to facilitate the receipt and processing of broadband signals. Additionally, the execution of computer-implemented instructions or computer-executable instructions by the customer device 110 may form a special purpose computer or other particular machine operable to facilitate the communication of upstream signals to the service provider system.

The customer device 110 may include one or more processors 151, one or more memory devices 152, one or more input/output ("I/O") interfaces 153, and/or one or more network interfaces 154. The processor(s) 151 may be configured to execute any number of software applications and/or computer-readable or computer-executable instructions. The memory devices 152 may include any number of suitable memory devices, such as caches, read-only memory devices, random access memory devices, magnetic storage devices, etc. The memory devices 152 may store data, executable instructions, and/or various program modules utilized by the processor(s) 151, such as data files 155, an operating system ("OS") 156, an equalization module 157, and/or a programming module 158.

The data files 155 may include any suitable data that facilitates the operation of the customer device 110. Examples of information that may be stored in the data files 155 include, but are not limited to, information associated with the customer device 110, information associated with available services that may be provided by the customer device 110, user preferences, and/or equalization information. The OS 156 may be a suitable software module that controls the general operation of the customer device 110. The OS 156 may also facilitate the execution of other software modules, for example, the equalization module 157 and/or the programming module 158.

The equalization module 157 may be a suitable software module or software application configured to perform adaptive equalization for the customer device 110. For example, the equalization module 157 may actively correct signal echoes and other linear impairments. In operation, the equalization module 157 may direct the communication of a signal to the CMTS 120. In certain embodiments, the signal may be a signal generated by the equalization module, such as a signal containing a status of the customer device 110. In other embodiments, the signal may be a reflection or echo of a signal output by the CMTS 120. Due to interferences and/or impairments within the distribution network, the signal communicated to the CMTS 120 may include a wide variety of different distortions and/or modulation errors. As explained in greater detail above, the equalization module 137 of the CMTS 120 may receive the signal, determine a linear impairment associated with the customer device 110, and provide an equalization coefficient and/or pre-distortion information to the customer device 110. The equalization module 157 of the customer device 110 may then utilize the equalization coefficient to pre-distort a received broadband signal in order to compensate for the distortions and linear impairments. Additionally, the processing of the equalization module 157 may be periodically and/or continuously performed in order to correct modulation errors.

The programming module 158 may be a suitable software module or software application configured to process received broadband signals, process the broadband signals, and provide broadband services to users of the customer device 110. For example, the programming module 158 may process received television programming data and output audio and/or visual data for presentation to users of the customer device 110. As another example, the programming module 158 may process received data to provide electronic program guide services to users of the customer device 110. Additionally, the programming module 158 may provide a wide variety of upstream communications to the service provider system 105, such as user requests for on-demand programming and/or pay-per-view programming.

With continued reference to the customer device 110, the one or more I/O interfaces 153 may facilitate communication between the customer device 110 and one or more input/output devices, for example, one or more user interface devices, such as a remote control, microphone, speaker, display, etc., that facilitate user interaction with the customer device 110. In this regard, user commands (e.g., programming commands, etc.) may be received by the customer device 110, and data associated with broadband services may be output for presentation to users of the customer device 110. The one or more network interfaces 154 may facilitate connection of the customer device 110 to any number of suitable networks, for example, the one or more service provider networks 115.

Communications between various components of the system 100 may be facilitated via any number of suitable networks, such as one or more service provider networks 115 (e.g., a cable network). The networks 115 may include any number of components and/or communications devices, such as optical fibers, fiber nodes, coaxial cable, amplifiers, cable taps, and/or cable drops. In certain embodiments, the physical components associated with the networks 115 may introduce distortions and/or impairments that are addressed by embodiments of the invention.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Operational Overview

Figure 2:
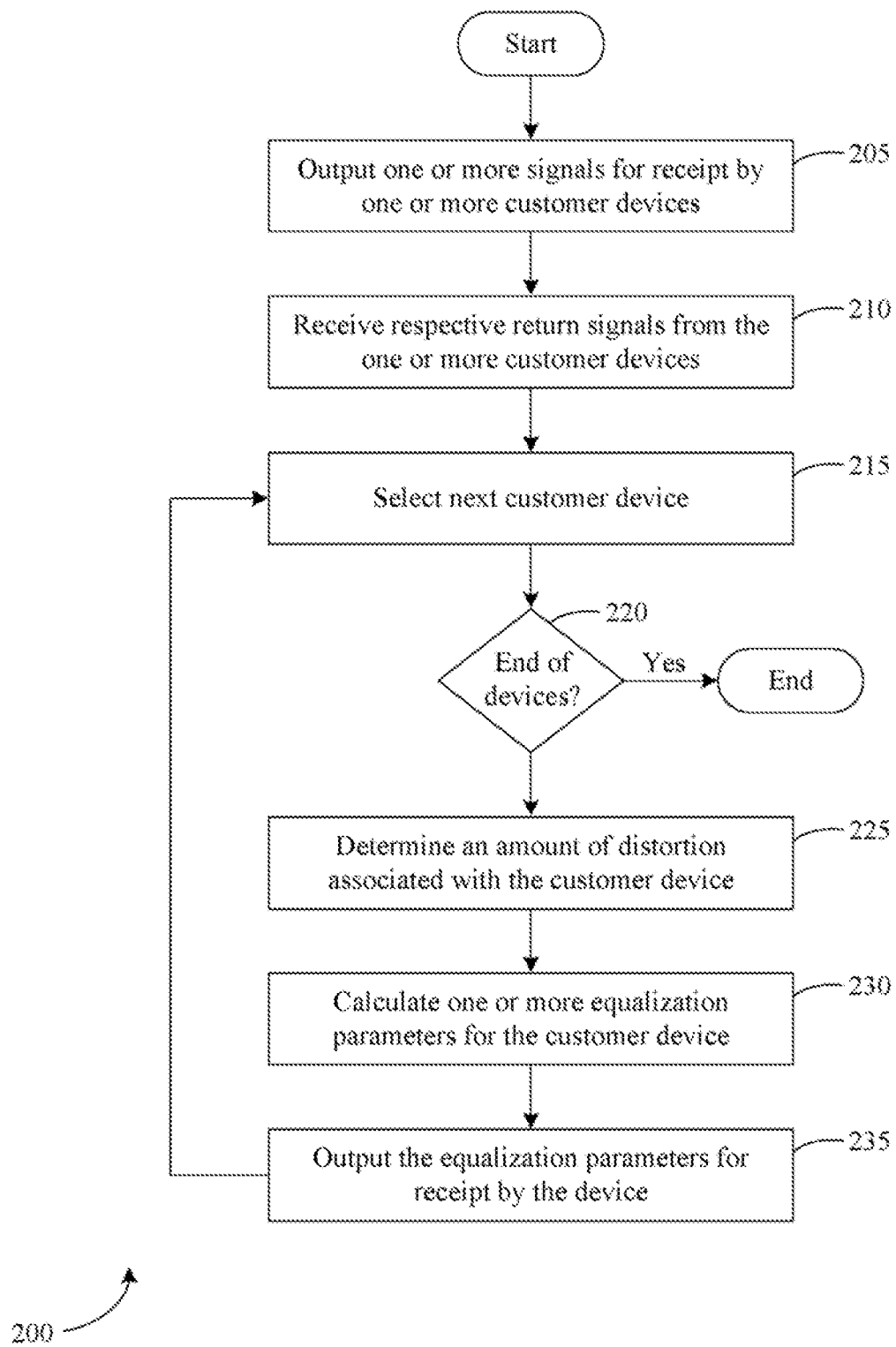
FIG. 2 is a flow diagram of an example method for determining equalization parameters for customer devices, according to an example embodiment of the invention.

FIG. 2 is a flow diagram of an example method 200 for determining equalization parameters for customer devices, according to an example embodiment of the invention. In certain embodiments, the method 200 may be performed by a suitable service provider system and/or equalization module, such as the service provider system 105 and/or the equalization module 137 illustrated in FIG. 1. The method 200 may begin at block 205.

At block 205, one or more signals, such as broadband communications signals and/or equalization signals, may be output for communication to one or more customer devices, such as the customer devices 110 illustrated in FIG. 1. The signals may be processed by the customer devices 110, and respective return signals may be received from the customer devices 110 at block 210. For example, output signals may be reflected or echoed from the customer devices 110 in order to communicate return signals. The received return signals may be processed in order to identify impairment information associated with each of the customer devices 110 and to generate equalization coefficients and/or equalization information for the customer devices 110.

At block 215, a next customer device 110 may be selected for processing. At block 220, a determination may be made as to whether the end of the customer devices 110 has been reached. If it is determined at block 220 that the end of the customer devices 110 has been reached, then operations may end. If, however, it is determined at block 220 that the end of the customer devices 110 has not been reached, then operations may continue at block 225.

At block 225, a signal received from the selected customer device 110 may be processed in order to determine an amount of distortion and/or linear impairment associated with the customer device 110. For example, one or more impairment coefficients for the customer device 110, such as a frequency response, a phase, and/or a group delay, may be determined. Based upon the calculated distortion and/or impairment coefficients, one or more equalization parameters, such as an equalization coefficient, may be calculated for the customer device 110 at block 230. In certain embodiments, an equalization coefficient may be determined based at least in part upon performing a Fourier transform on the impairment coefficients and/or distortion information. For example, impairment coefficient data combined with frequency and channel width may be processed by a Fourier transform to calculate an equalization coefficient.

Once one or more equalization parameters (e.g., an equalization coefficient, etc.) are calculated, the equalization parameters may be output for communication to the customer device 110 at block 235. The customer device 110 may utilize the equalization parameters to pre-distort received signals and compensate for distortions and/or impairments added to the signal. As desired, following the pre-distortion, the customer device 110 may communicate another signal that may be processed to calculate one or more revised equalization parameters that are output to the customer device 110. This process may be repeated in an adaptive manner to correct or compensate for distortions and/or impairments.

Following the communication of one or more equalization parameters, such as an equalization coefficient, to the selected customer device at block 235, operations may continue at block 215, and a next customer device may be selected for processing.

The method 200 may end following block 220.

Figure 3:
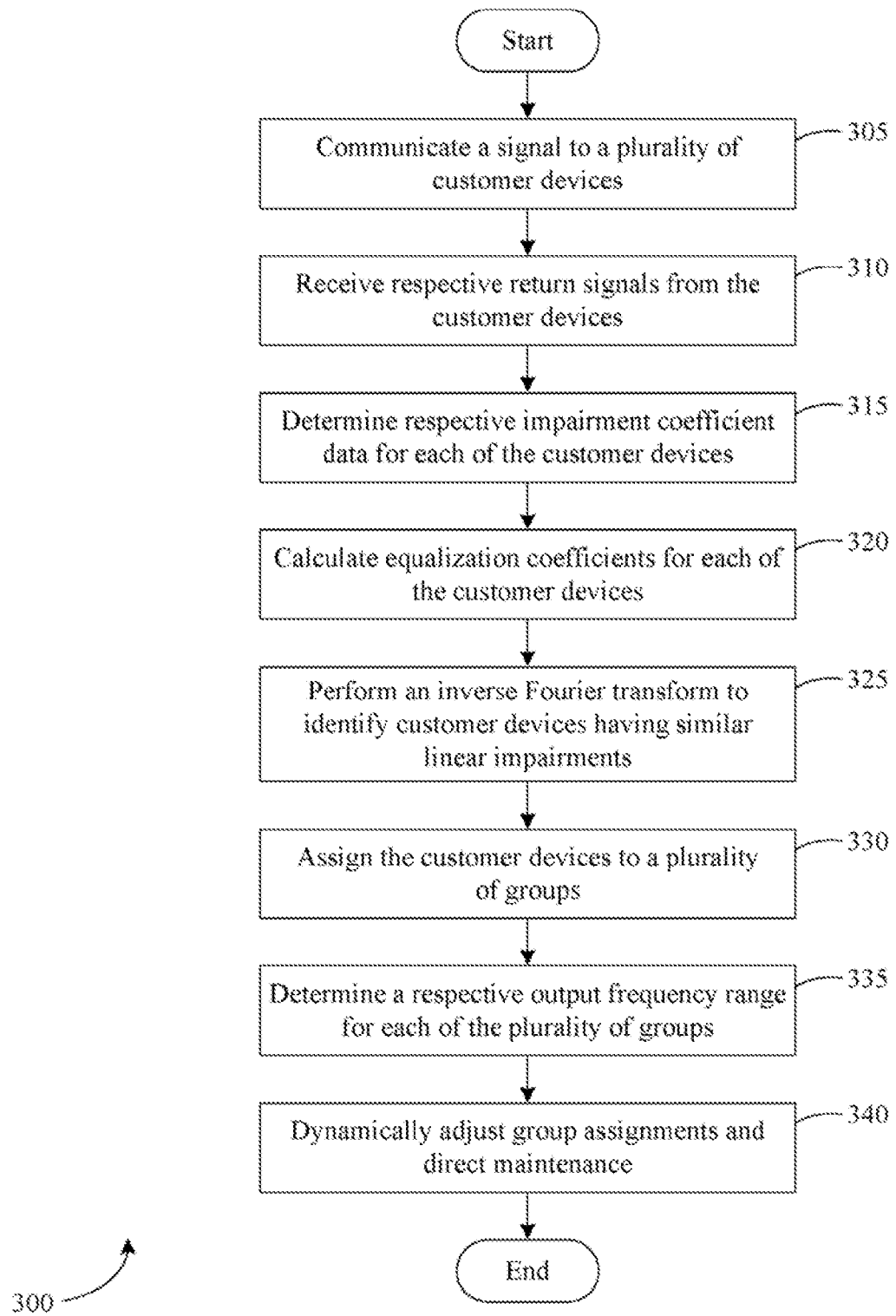
FIG. 3 is a flow diagram of an example method for assigning customer devices to groups for the transmission of broadband data signals, according to an example embodiment of the invention.

FIG. 3 is a flow diagram of an example method 300 for assigning customer devices to groups for the transmission of broadband data signals, according to an example embodiment of the invention. In certain embodiments, the operations of the method 300 may be performed by a suitable service provider system and/or virtual node module, such as the service provider system 105 and/or the virtual node module 147 illustrated in FIG. 1. The method 300 may begin at block 305.

At block 305, a signal, such as a status signal and/or an equalization signal, may be output by a service provider system 105 for communication to any number of customer devices 110. For example, a signal may be output by a CMTS, such as the CMTS 120 illustrated in FIG. 1, for communication to a plurality of different customer devices 110. As desired in certain embodiments, a plurality of different signals may be output. During communication of the signal to a customer device 110, a wide variety of impairments may be introduced into the signal. For example, impairments may be introduced by optical fiber nodes, cable taps, amplifiers, coaxial cables, and/or other components of a cable distribution network.

Once a signal is received by a customer device 110, a return signal may be output by the customer device 110 for communication to the service provider system 105. For example, the signal output by the service provider system 105 may be echoed or reflected to the CMTS 120. As an alternative to reflecting or returning a received signal, a status signal or an equalization signal may be generated by the customer device 110, and the generated signal may be output by the customer device 110 for communication to the service provider system 105. The return signals may be received by the service provider system 105 at block 310.

Once signals and/or communications have been received by the service provider system 105 for the plurality of customer devices 110, the service provider system may process the signals at block 315 to determine or calculate respective impairment coefficient data for each of the customer devices 110. For example, a frequency response, a phase, and/or a group delay may be determined for each of the customer devices 110. Additionally, an amount of distortion and/or impairment associated with each of the customer devices 110 may be determined.

At block 320, an equalization coefficient may be calculated for each of the customer devices 110. In certain embodiments, the equalization coefficients may be determined based at least in part upon performing a Fourier transform on the impairment coefficients and/or distortion information. For example, impairment coefficient data combined with frequency and channel width may be processed by a Fourier transform to calculate an equalization coefficient for a customer device 110. Once an equalization coefficient is calculated for a customer device 110, the equalization coefficient may be communicated to the customer device 110. The customer device 110 may utilize the equalization coefficient to pre-distort received signals and compensate for distortions and/or impairments added to the signal. As desired, following the pre-distortion, the customer device 110 may communicate another signal to the CMTS 120 that may be processed to calculate a revised equalization coefficient that is output to the customer device 110. This process may be repeated in an adaptive manner to correct or compensate for distortions and/or impairments.

At block 325, the impairment information for the customer devices 110 may be utilized to identify customer devices 110 having similar linear impairments. In certain embodiments, an inverse Fourier transform may be performed on the linear impairment information to generate a distribution of customer devices 110. At block 330, the customer devices 110 may be sorted into groups, and each customer device 110 assigned to a particular group may have similar linear impairments. At block 335, a respective output frequency or frequency range may be identified or determined for each of the groups of customer devices 110. In certain embodiments, a different frequency and/or different range of frequencies may be utilized for each of the respective groups to communicate broadband signals to the customer devices 110 assigned to the respective groups.

According to an aspect of the invention, the linear impairments associated with the customer devices 110 may be taken into account during the assignment of the customer devices 110 to groups. Additionally, groups associated with relatively greater linear impairments may be associated with relatively lower frequency ranges. For example, customer devices 110 having relatively low impairments may be associated with a group having a relatively high frequency range, and customer devices 110 having relatively high impairments may be associated with a group having a relatively low frequency range. As a result, the downstream frequency band may be divided in order to maximize the capabilities of physical equipment (e.g., coaxial cables) and reduce maintenance requirements.

At block 340, the linear impairments associated with each of the plurality of customer devices 110 may be periodically or continuously monitored. Additionally, the assignments of customer devices 110 to the various groups of customer devices 110 may be dynamically adjusted. For example, if a relatively greater amount of linear impairment is determined for a customer device 110, the customer device may be assigned to a group having a lower range of output frequencies. Additionally, changes in linear impairments may be utilized to identify physical equipment, such as coaxial cables, that should be serviced or replaced. As desired, maintenance may be directed based upon identified changes in linear impairments and/or reassignments of customer devices 110.

The method 300 may end following either block 335 or block 340.

Figure 4:
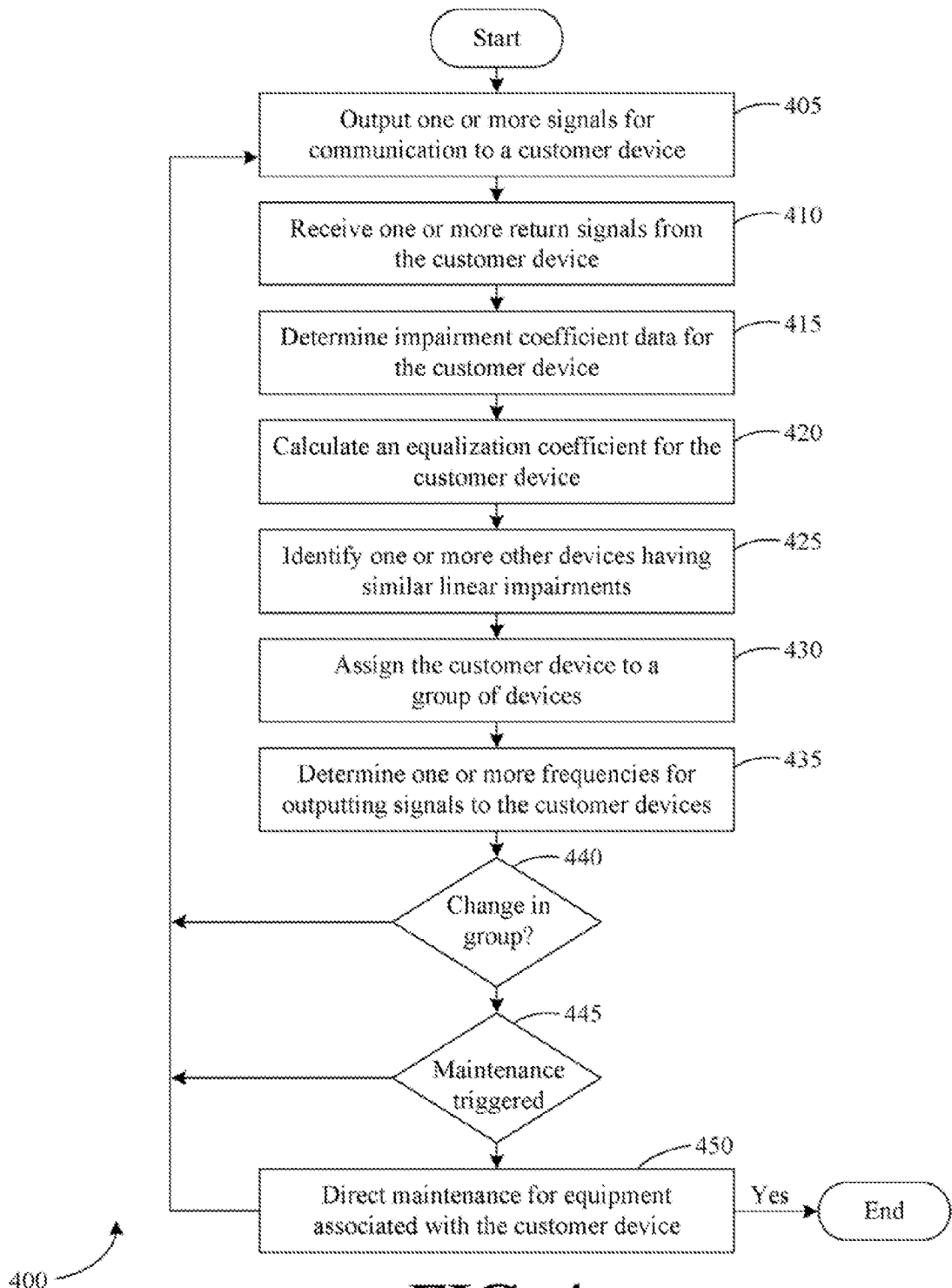
FIG. 4 is a flow diagram of an example method for monitoring the impairments associated with a customer device and assigning the customer device to a group for the transmission of broadband data signals, according to an example embodiment of the invention.

FIG. 4 is a flow diagram of an example method 400 for monitoring the impairments associated with a customer device and assigning the customer device to a group for the transmission of broadband data signals, according to an example embodiment of the invention. In certain embodiments, the operations of the method 400 may be performed by a suitable service provider system and/or virtual node module, such as the service provider system 105 and/or the virtual node module 147 illustrated in FIG. 1. The method 400 may begin at block 405.

At block 405, one or more signals, such as a status signal and/or an equalization signal, may be output by a service provider system 105 for communication to a customer device, such as the customer device 110 illustrated in FIG. 1. For example, a signal may be output by a CMTS, such as the CMTS 120 illustrated in FIG. 1. During communication of the signal to a customer device 110, a wide variety of impairments may be introduced into the signal. For example, impairments may be introduced by optical fiber nodes, cable taps, amplifiers, coaxial cables, and/or other components of a cable distribution network.

Once a signal is received by the customer device 110, a return signal may be output by the customer device 110 for communication to the service provider system 105. For example, the signal output by the service provider system 105 may be echoed or reflected to the CMTS 120. As an alternative to reflecting or returning a received signal, a status signal or an equalization signal may be generated by the customer device 110, and the generated signal may be output by the customer device 110 for communication to the service provider system 105. The return signal may be received by the service provider system 105 at block 410.

At block 415, the service provider system may process the return signal to determine or calculate impairment coefficient data for the customer device 110. For example, a frequency response, a phase, and/or a group delay may be determined for the customer device 110. Additionally, an amount of distortion and/or impairment associated with each of the customer devices 110 may be determined. At block 420, an equalization coefficient may be calculated for the customer device 110. In certain embodiments, the equalization coefficient may be determined based at least in part upon performing a Fourier transform on the impairment coefficients and/or distortion information. For example, impairment coefficient data combined with frequency and channel width may be processed by a Fourier transform to calculate an equalization coefficient for the customer device 110. Once an equalization coefficient is calculated for the customer device 110, the equalization coefficient may be communicated to the customer device 110. The customer device 110 may utilize the equalization coefficient to pre-distort received signals and compensate for distortions and/or impairments added to the signal. As desired, following the pre-distortion, the customer device 110 may communicate another signal to the CMTS 120 that may be processed to calculate a revised equalization coefficient that is output to the customer device 110. This process may be repeated in an adaptive manner to correct or compensate for distortions and/or impairments.

At block 425, the impairment information for the customer device 110 may be utilized to identify one or more other customer devices having similar linear impairments. In certain embodiments, an inverse Fourier transform may be performed on the linear impairment information to generate a distribution of customer devices, and devices having similar linear impairments may be identified. At block 430, the customer device 110 may be assigned to a group of customer devices having similar linear impairments. Additionally, at block 435, a respective output frequency or frequency range may be identified or determined for outputting signals (e.g., broadband signals) to the customer device 110. For example, a frequency range associated with the group to which the customer device 110 is assigned may be identified as a frequency range for outputting signals to the customer device 110.

As desired in various embodiments of the invention, the linear impairments associated with the customer device 110 may be periodically or continuously monitored. As a result, the customer device 110 may be dynamically reassigned to another group of customer devices. For example, if an increase in the linear impairments associated with the customer device 110 is identified, then the customer device 110 may be reassigned to another group having a relatively lower output frequency range. In this regard, the physical limitations of a service network that facilitates communications with the customer device 110 may be taken into consideration.

At block 440, a determination may be made as to whether a change in the group assignment for the customer device 110 has been identified. If it is determined at block 440 that no change has been identified, then operations may continue at block 405, and the customer device 110 may continue to be monitored. For example, one or more equalization signals may continue to be output to the customer device 110 to facilitate the determination of linear impairments. If, however, it is determined at block 440 that the customer device 110 has been reassigned to another group of customer devices, then operations may continue at block 445.

At block 445, a determination may be made as to whether maintenance should be performed for the customer device 110 and/or service provider equipment associated with the customer device. For example, a determination may be made as to whether one or more coaxial cables and/or terminations associated with the customer device have degraded to a sufficient level such that the equipment should be replaced or otherwise serviced. If it is determined at block 445 that no maintenance should be performed, then operations may continue at block 405, and the customer device 110 may continue to be monitored. If, however, it is determined at block 445 that maintenance should be performed or that a maintenance evaluation has been triggered, then operations may continue at block 450.

At block 450, maintenance for equipment associated with the customer device 110 may be directed. For example, one or more technicians may be dispatched to evaluate, service, and/or replace equipment associated with the customer device 110. In certain embodiments, the monitoring of a plurality of customer devices may be taken into account during the direction of maintenance. For example, a determination may be made that a coaxial cable supplying service to a plurality of households has degraded. Following block 450, operations may continue at block 405, and the customer device 110 may continue to be monitored.

In certain embodiments, the method 400 may be performed in a repeating or looping manner in order to continuously monitor the customer device 110.

The operations described and shown in the methods 200, 300, and 400 of FIGS. 2-4 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-4 may be performed.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
   determining, by a service provider system associated with a service provider and comprising one or more computers, respective linear impairment information for a plurality of customers of the service provider;
   assigning, by the service provider system based at least in part upon an analysis of the determined linear impairment information, each of the plurality of customers to one of a plurality of groups, wherein the customers assigned to each of the plurality of groups are associated with similar linear impairments;
   determining, by the service provider system, for each of the plurality of groups, a range of frequencies at which communications will be output by the service provider for receipt by the customers assigned to the respective group, the determination of the range of frequencies further comprising:
      determining, by the service provider system, for each of the plurality of groups, an approximate amount of linear impairment associated with the respective group;
      determining, by the service provider system, for a first group of the plurality of groups having a first approximate amount of linear impairment, a first range of frequencies based at least in part on the determined amount of linear impairment; and
      determining, by the service provider system, for a second group of the plurality of groups having a second approximate amount of linear impairment greater than the first approximate amount, a second range of frequencies based at least in part on the determined amount of linear impairment, wherein the second range of frequencies is lower than the first range of frequencies.

2. The method of claim 1, wherein determining respective linear impairment information comprises:
   determining, by the service provider system, respective impairment coefficient data for each of the plurality of customers; and
   calculating, by the service provider system based at least in part on performing a Fourier transform on the impairment coefficient data, a respective equalization coefficient for each of the plurality of customers.

3. The method of claim 2, wherein determining respective impairment coefficient data comprises determining at least one of (i) a frequency response, (ii) a phase, or (iii) a group delay.

4. The method of claim 1, wherein assigning each of the plurality of customers to one of a plurality of groups comprises:
identifying, by the service provider system based at least in part on performing an inverse Fourier transform, customers having similar linear impairments; and
grouping, by the service provider system, the customers having similar linear impairments.

5. The method of claim 1, further comprising determining, by the service provider system, for each of the plurality of groups, one or more frequencies comprising the range of frequencies, wherein the range of frequencies will be output by the service provider for receipt by respective devices associated with the customers included in the group.

6. The method of claim 1, wherein determining a range of frequencies for each of the plurality of groups comprises determining, for each of the plurality of groups, a respective frequency range having a bandwidth of approximately 200 Megahertz.

7. The method of claim 1, wherein assigning each of the customers to one of a plurality of groups comprises assigning, based at least in part upon first linear impairment information, a customer included in the plurality of customers to a third group included in the plurality of groups, and further comprising:
determining, by the service provider system, second linear impairment information for the customer; and
reassigning, by the service provider system based at least in part on the second linear impairment information, the customer to a fourth group included in the plurality of groups.

8. The method of claim 7, further comprising:
directing, by the service provider system based at least in part on the reassignment, maintenance of equipment associated with the customer.

9. The method of claim 1, wherein the service provider system comprises at least one of a cable network or a hybrid fiber coaxial network.

10. The method of claim 1, wherein the range of frequencies is between approximately 88 megahertz and approximately 1 gigahertz.

11. A system comprising:
at least one communications interface configured to receive, from a plurality of devices associated with customers of a service provider, respective equalization data for each of the plurality of devices; and
at least one processor configured to (i) determine, based at least in part upon the equalization data, respective linear impairment information for each of the plurality of devices, (ii) assign, based at least in part upon an analysis of the determined linear impairment information, each of the plurality of devices to one of a plurality of groups, wherein the devices assigned to each of the plurality of groups are associated with similar linear impairments, (iii) determine, for each of the plurality of groups, a range of frequencies at which communications will be output by the service provider for receipt by the devices assigned to the respective group, the determination of the range of frequencies further comprising: determining, for each of the plurality of groups, an approximate amount of linear impairment associated with the respective group; determining, for a first group of the plurality of groups having a first approximate amount of linear impairment, a first range of frequencies based at least in part on the determined amount of linear impairments; and determining, for a second group of the plurality of groups having a second approximate amount of linear impairment greater than the first approximate amount, a second range of frequencies based at least in part on the determined amount of linear impairment, wherein the second range of frequencies is lower than the first range of frequencies.

12. The system of claim 11, wherein the at least one processor is further configured to (i) determine, based at least in part upon the equalization data, respective equalization coefficient data for each of the plurality of devices and (ii) calculate, based at least in part on performing a Fourier transform of the equalization coefficient data, the respective linear impairment information for each of the plurality of devices.

13. The system of claim 12, wherein the equalization coefficient data comprises at least one of (i) a frequency response, (ii) a phase, or (iii) a group delay.

14. The system of claim 12, wherein the at least one processor is further configured to (i) identify, based at least in part on performing an inverse Fourier transform, customers having similar linear impairments, and (ii) group the customers having similar linear impairments.

15. The system of claim 11, the at least one processor further configured to determine one or more frequencies for each of the plurality of groups comprising a respective range of frequencies at which communications will be output by the service provider for receipt by devices assigned to the group.

16. The system of claim 11, wherein a determined range of frequencies for each of the plurality of groups comprises a frequency range having a bandwidth of approximately 200 Megahertz.

17. The system of claim 11, wherein a device included in the plurality of devices is assigned to a third group included in the plurality of groups, and
wherein the at least one processor is further configured to (i) determine second linear impairment information for the device, and (ii) reassign, based at least in part on the second linear impairment information, the device to a fourth group included in the plurality of groups.

18. The system of claim 17, wherein the at least one processor is further configured to direct, based at least in part on the reassignment, maintenance of equipment associated with the device.

19. The system of claim 11, wherein the service provider system comprises at least one of a cable network or a hybrid fiber coaxial network.

20. The system of claim 11, wherein the range of frequencies is between approximately 88 megahertz and approximately 1 gigahertz.

* * * * *